United States Patent [19]

Ball

[11] 4,200,491
[45] Apr. 29, 1980

[54] APPARATUS AND METHOD FOR DETECTING POWER DISTRIBUTION IN A NUCLEAR REACTOR FUEL ELEMENT

[75] Inventor: Russell M. Ball, Lynchburg, Va.

[73] Assignee: Electric Power Research Institute, Inc., Palo Alto, Calif.

[21] Appl. No.: 794,441

[22] Filed: May 6, 1977

[51] Int. Cl.² .................................................. G21C 17/00
[52] U.S. Cl. .................................. 176/19 R; 176/86 R
[58] Field of Search ........................ 176/10, 19 R, 86 R, 176/93 R; 250/390–392, 303, 336

[56] References Cited

U.S. PATENT DOCUMENTS

| | | | |
|---|---|---|---|
| 2,707,555 | 5/1955 | Gaudin | 250/390 |
| 2,866,741 | 12/1958 | Hausner | 176/93 R |
| 3,202,619 | 8/1965 | Baron | 176/92 R |
| 3,255,092 | 6/1966 | Dee, Jr. | 176/93 R |
| 3,350,231 | 10/1967 | Hentz | 176/10 |

FOREIGN PATENT DOCUMENTS

| | | | |
|---|---|---|---|
| 790699 | 7/1968 | Canada | 176/19 R |
| 866514 | 4/1961 | United Kingdom | 176/19 J |

OTHER PUBLICATIONS

Nucleonics, vol. 15, No. 4, (1957), pp. 80–83, Francis et al.
GEAP-5190, p. 17 (6/1/66), Howard.
Nuclear Radiation Detection, 2nd Ed., (1964), Price, pp. 332–335.
Conf. 650803–40 (1965), Preprint 67/45, Rasmussen et al., pp. 829–847.

Primary Examiner—Samuel W. Engle
Assistant Examiner—S. A. Cangialosi
Attorney, Agent, or Firm—Townsend and Townsend

[57] ABSTRACT

In order to map the power distribution of a nuclear fuel element, a passive detector is laid along the fuel element in situ to record the residual radiation of the fuel element. The detector spatially records the residual radiation as an image in a radioactive reaction product. In the preferred embodiment, the detector comprises a cylindrical casing or wand enshrouding a material which converts incident gamma radiation having an energy level exceeding a preselected threshold to a correspondingly distributed neutron radiation field. The sheath encases a neutron field-sensitive activant, such as gold in the form of a filament longitudinally disposed in the casing. The image of the low-level radiation field can thereafter be analyzed according to relatively risk-free techniques to map the power distribution of the fuel element.

6 Claims, 1 Drawing Figure

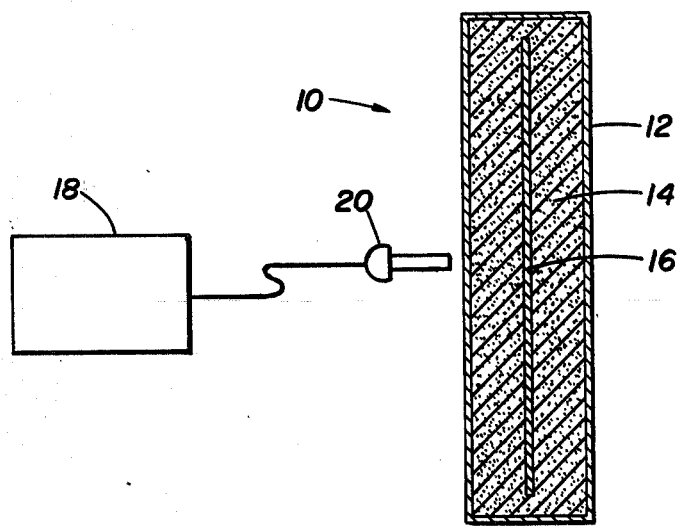
FIG.—1.

APPARATUS AND METHOD FOR DETECTING POWER DISTRIBUTION IN A NUCLEAR REACTOR FUEL ELEMENT

This invention was made under contract with or supported by the Electric Power Research Institute, Inc. of Palo Alto, Calif.

BACKGROUND OF THE INVENTION

I. Field of the Invention

This invention relates to measuring the power distribution of a nuclear reactor fuel element. In particular, the invention relates to a method and passive apparatus for analysis of power distribution history through the measurement of residual radiation along a fuel element.

In order to verify the accuracy of nuclear calculations and to determine if anomalies occurred in the power production of the nuclear fuel, it is desirable to map the recent power distribution of a reactor and of the individual nuclear fuel elements. It has been found that the deposition of certain fission products in a fuel element or rod, specifically radioactive lanthanum-140 which is a fission product of barium, does not migrate within the fuel element and thus is representative of the recent reaction history of the nuclear fuel. The reaction history is directly correlated to the most recent power production, a consequence of the relatively short half-life of the parent reactant, barium-140. Thus, measurement of the radiation emission of lanthanum-140—which must be discriminated from other residual radiation—can be used to construct an accurate map of reactor power distribution.

II. Description of the Prior Art

In the past, gamma radiation from fuel elements has been measured by scanning each fuel element with collimated radiation detector capable of sensing radiation and of discriminating levels of energy. Typically, a sodium iodide scintillation type sensor or a germanium-lithium solid state sensor is used to detect gamma radiation, together with appropriate electronic and signal processing apparatus. There is, however, a substantial danger of exposure of the detector operator to dangerous levels of gamma radiation during measurement of the residual radiation of spent, yet radiating, fuel elements, since the detectors have in the past been manipulated by the operator in close proximity to the fuel elements. Therefore, a shielded detector system has been a requirement of prior art systems. Water has been the usual means of shielding the fuel element to be measured, so the prior art sensors were generally adapted to operate underwater. In summary, according to prior art methods, to determine a distribution history of a fuel element, each element was removed from the reactor, immersed in a shielding medium and slowly scanned by a sensor which generated exposure data one point at a time along one fuel element at a time. This technique has required extensive correction for radiation decay to account for scan time differences at different spatial locations along the fuel element.

SUMMARY OF THE INVENTION

In order to overcome the disadvantages of prior art detectors, a radiation detector of the present invention spatially discriminates in situ the distributed radiation of a spent nuclear reactor fuel element. A sensor according to the invention comprises a cylindrical casing or wand which enshrouds a material that converts incident gamma radiation having an energy level exceeding a predetermined threshold to a correspondingly distributed neutron radiation field. The incident gamma radiation is identifiable with a particular short lifetime reaction product representing recent power distribution, such as lanthanum-140. The converter material, which may be beryllium or deuterium or a compound thereof, sheaths a neutron field-sensitive activant, such as gold, in the form of a filament longitudinally disposed in the casing. The activant receives, and in essence stores along its length, information on the level and distribution of incident neutron radiation by creation of radioactive isotope characterized by a long lifetime of low level radiation which can later be measured by conventional low level and relatively safe radiation detection techniques.

In operation, a wand according to the invention is placed alongside a spent fuel element within a reactor core and left for several hours to a few days to fully expose the activant. The wand is thereafter removed for analysis.

One of the purposes of the present invention is to provide means for analyzing the power distribution history of a nuclear reactor fuel element in order to monitor the proper and efficient operation of a nuclear reactor. The present invention also provides means for measuring fission product power distribution history without danger of exposure of operators to radiation. According to the invention, the residual radiation of spent fuel elements can be measured and recorded by an in situ detector. Thus, measurements can be made with virtually no danger of exposure to dangerous levels of radiation.

Another purpose of the invention is to provide means and a method for measuring the spatial distribution of residual short lifetime gamma radiation without compensation for time-related residual radiation decay. An advantage of the present invention in this instance is that distributed short lifetime residual radiation is simultaneously measured in a manner creating a relatively persistent spatial image more readily analyzed by conventional lower level radiation detection methods. Thus, the need to correct for time-related decay differences is eliminated.

Other purposes and advantages of this invention will become apparent upon reference to the following detailed description and accompanying drawing.

BRIEF DESCRIPTION OF THE DRAWING

The single FIGURE is a vertical cross-sectional view of a detector made in accordance with the invention.

DETAILED DESCRIPTION OF THE PREFERRED EMBODIMENTS

The invention comprises a passive system which can be used to detect the presence of radioactive lanthanum-140, the short-lived residual product of radioactive barium-140. the distribution and concentration of the radioactive lanthanum-140 indicated by the intensity of high-energy gamma radiation provides an accurate map of fission product deposition.

Lanthanum-140 is characterized in that it emits gamma rays at a relatively high level of about 2.5 mev. In order to selectively produce a measurable neutron flux which corresponds to the level of gamma radiation, a threshold sensitive converter material is employed. Particular substances, such as beryllium and deuterium, exhibit a characteristic photoneutron reaction which has insignificant cross-section to radiation below an energy threshold. Above the characteristic threshold level of radiation, a photoneutron flux is created which is sufficiently high to activate materials for measuring neutron flux.

The photoneutron reaction threshold of beryllium is known to be at 1.67 mev. For deuterium, the corresponding threshold energy level is 2.22 mev.

One material commonly used to measure neutron flux is the activant gold. Gold and other activant materials such as silver, lutetium and manganese are known to create isotopes exhibiting a long-lived radiation emission characteristic which directly corresponds to the level of incident radiation. This isotope radiation emission characteristic can later be measured by conventional low level radiation detectors.

By way of explanation and definition, the term activant is used herein to indicate materials suitable as a neutron flux detecting element. In particular, an activant is a material which, upon exposure to neutron flux, produces an activated isotape emitting radiation with a relatively long half life. For the purposes of the invention, the activant is a material having a neutron activation cross section of greater than about ten barns ($10 \times 10^{-24}$ cm$^2$) and whose activated isotope emits gamma or beta radiation with an energy greater than about 50,000 electron volts with a half life of greater than about one hour.

Turning now to the figure, there is depicted one practical embodiment of a device operative according to the invention for detecting and recording emissions of lanthanum-140, indicating the recent history of power distribution of a nuclear reactor fuel element. The device comprises a wand 10 consisting of a longitudinally extended tubular casing 12 filled with a sheathing material 14, such as a beryllium oxide (BeO) compound, in which is embedded a centrally disposed longitudinally extended activant 16. The casing 12 is preferably circularly cylindrical. The activant 16 may be a filament such as gold wire or another of the above named materials. A gold wire on the order of 2 mm diameter is sufficient in size. The diameter of the finished cylindrical wand 10 is sufficiently small to permit it to be introduced into the spaces between individual fuel rods of a nuclear reactor (not shown), for instance, through the holes and guide tubes used for the introduction of control rods or pins. A wand diameter of 10 mm should satisfy these requirements.

The casing 12 may be a metal such as stainless steel or Zircaloy which is transmissive of gamma radiation. The casing 12 is hermetically sealed by a suitable process such as swaging or soldering to enclose the sheathing material 14 and the gold wire 16. The gold activant 16 may be on the order of 2 mm thick extending the length of the detector wand 10.

The detector in cylindrical form may be manufactured in a manner similar to that used for the manufacture of thermocouples or other solid state neutron detectors. For instance, a tubular casing 12 may be swaged or drawn in a manner generally well-known in the arts.

The invention need not be limited to tubular configured wands, however. A sheet detector might also find useful application. For example, a sheet may comprise sheaths 14 of neutron flux converter material sandwiching an activant foil 16 which is similarly sensitive to the neutron flux generated by the sheaths 14.

The technique for use of the wand 10 illustrates the method of the invention. After the termination of the operation of the nuclear reactor, one or more wands 10 may be introduced into each fuel element whose power distribution is to be measured. The high energy gamma radiation of the short-lived lanthanum-140 activates the beryllium insulative sheath 14 which produces a secondary radiation of neutrons. The neutrons further interact with the gold to create long-lived low level radiation isotopes. The wands 10 are left in place until the neutron flux-sensitive activant 16 (the gold wire) is adequately exposed. This may normally take on the order of a few hours to several days. After the period of exposure is completed, the wands 10 are removed from the reactor fuel element for further analysis. The activant can then be analysed by passing each wand 10 through a collimated low level radiation detector which would identify the location and intensity of power production in the fuel element so that the actual power distribution history can be identified and mapped.

The present invention has a number of advantages over the prior art. In particular, the invention can be used with fuel elements after discharge from the reactor to indicate power distribution during the most recent exposure history of the reactor. Secondly, the present invention stores information which can be read by an off-line system a point at a time, as for example, by means of a data collection apparatus 18 coupled to receive signals indicative of the residual radiation through a detection head 20, thereby avoiding any necessity of attempting to read all infomation simultaneously or to account for decay resulting from the time differential of detected primary radiation.

A particular advantage of the present invention is that a shielded protector system is not required. Only low levels of radiation are generated in the final readout involved in this invention. Moreover, the final readout can be made at a relatively slow pace with substantially no concern over the time-dependent decay of primary radiation of the relatively short half-lived fission products.

The invention has been described in conjunction with specific embodiments. Other embodiments incorporating the same or substantially identical features of the present invention will be suggested to those of ordinary skill in the art in view of this disclosure. It is therefore not intended that this invention be limited, except as indicated by the appended claims.

I claim:

1. A device for detecting the residual gamma radiation indicative of the recent power distribution of a used nuclear reactor fuel element comprising the combination of:

a radiation detector of the type for decoding information available as to activated isotope emission along a filament wire; and a wand, said wand being of sufficiently small diameter to be removably juxtaposed along said nuclear reactor fuel element and to be analyzed by said radiation detector, said wand comprising:

(a) a filament wire longitudinally disposed within a tubular housing of said wand composed of an activant medium, said activant medium being operative to register incident neutron flux as a long half life activated isotope along the length of said filament wire; and (b) a sheath of converter material encasing said filament wire, said sheath being operative to produce neutron flux proportional only to incident gamma radiation in excess of a predetermined energy threshold emitted by said fuel element defined by the gamma emission of La-140 for registering said neutron flux in said filament wire as a spatial distribution of a long half life activated isotope which spatial distribution is directly proportional to the spatial distribution of fission products of said nuclear reactor fuel element.

2. A detecting device according to claim 1 wherein said filament is about 2 mm in diameter and said casing is about 10 mm in diameter.

3. A power distribution detecting device according to claim 1 wherein said converter medium is beryllium oxide.

4. A power distribution detecting device according to claim 1 wherein said neutron flux activant medium is a material having a neutron activation cross section of greater than about ten barns and whose activated isotope emits gamma or beta radiation with an energy greater than about 50,000 electron volts with a half life of greater than about one hour.

5. A power distribution detecting device according to claim 4 wherein said neutron flux activant medium comprises a member of the group consisting of gold, silver, manganese and lutetium.

6. A method for analyzing the recent power distribution of a used nuclear reactor fuel element comprising the steps of:

providing a sheathing of a converting medium about a filament wire of an activant medium to form a wand, said converting medium being operative to selectively produce neutron flux proportional only to incident gamma radiation above a preselected energy threshold, said activant medium being operative to register incident neutron flux as a long half life activated isotope;

after a cooling period following shutdown of a nuclear reactor, juxtaposing said wand along a nuclear reactor fuel element within said nuclear reactor fixed in relation to said fuel element for a sufficient period to allow gamma fission products of La-140 to cause neutron flux generation within said converter medium and further to allow said neutron flux so generated incident upon said filament wire to register in said filament as a spatial distribution of a long half life activated isotope, which spatial distribution is directly proportional to said fission products spatial distribution; thereafter removing said wand from said nuclear reactor; and thereafter detecting radiation of said long half life activated isotope to identify the location and intensity of said activated isotope for mapping the power distribution history of the nuclear reactor fuel element.

* * * * *